Aug. 22, 1967    D. E. KNIGHT    3,336,692
FISHING LURE
Filed Feb. 23, 1965    2 Sheets-Sheet 1
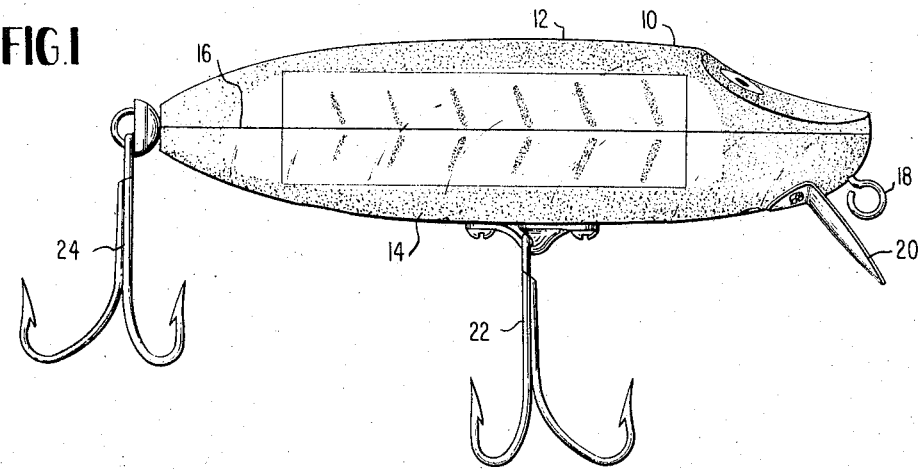
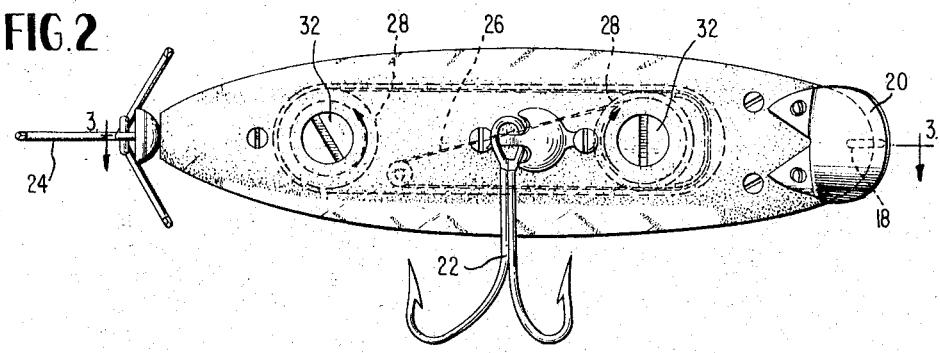
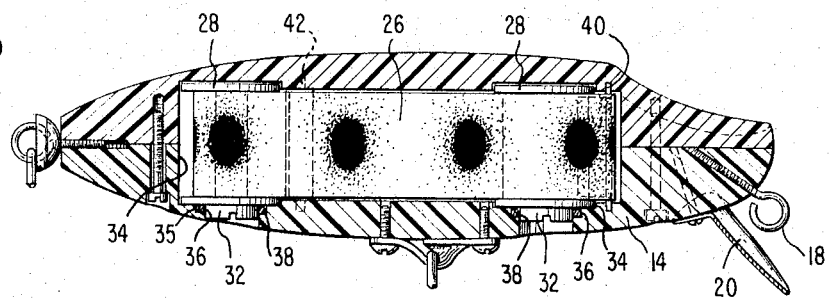
INVENTOR
DOUGLAS E. KNIGHT
ATTORNEYS Aug. 22, 1967  D. E. KNIGHT  3,336,692
FISHING LURE
Filed Feb. 23, 1965  2 Sheets-Sheet 2
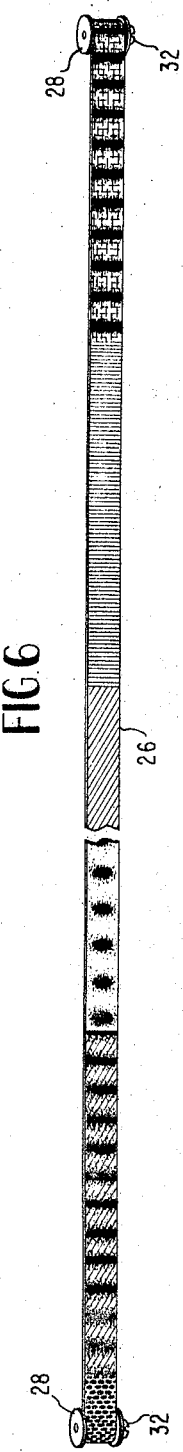
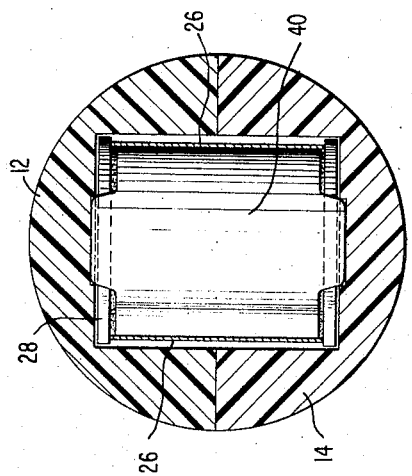
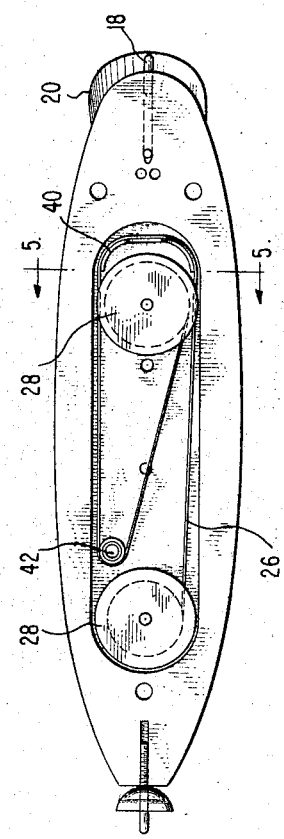
INVENTOR
DOUGLAS E. KNIGHT
BY
ATTORNEYS

3,336,692
FISHING LURE
Douglas E. Knight, 5005 McCall St., Rockville, Md. 20853
Filed Feb. 23, 1965, Ser. No. 434,330
5 Claims. (Cl. 43—42.33)

This invention relates to fishing lures and more particularly to artificial lures of the so-called "plug" type. As generally marketed today, a plug of a given body, shape or configuration is very generally sold in a plurality of different colors and/or patterns, sometimes called "finishes." In the past it has been proposed to sell a single such plug having interchangeable parts, thus providing for changing the color and/or pattern of the plug to suit the particular lighting and/or water conditions. An example of lures of this type may be found in the U.S. patent to Klein, 2,764,834, 1956. The obvious practical difficulty with devices of the type shown in the Klein patent is that it requires carrying a number of parts which are apt to become lost or misplaced and further, there is the difficulty in disassembling and reassembling the lure to form different patterns and/or finishes.

It is the principal object of the present invention to provide an artificial lure, the color and/or pattern of which may be changed at will without the necessity of disassembly and reassembly.

A further object is to provide a fishing lure with an internally contained changeable exhibitor which can be easily manipulated to change the pattern and/or color of the lure finish.

Other objects and advantages of the present invention will be apparent from the following detailed description when read in conjunction with the attached sheets of drawings in which:

FIGURE 1 is a side elevation of a preferred embodiment of a lure in accordance with the present invention;

FIGURE 2 is a bottom plan view of the lure shown in FIGURE 1;

FIGURE 3 is a section on the lines 3—3 of FIGURE 2;

FIGURE 4 is a top plan view of the lower half of the lure shown in FIGURES 1 to 3 with the upper portion removed to further illustrate the working parts of the changeable exhibitor;

FIGURE 5 is a section on the lines 5—5 of FIGURE 4 and;

FIGURE 6 is a plan view of a portion of the changeable exhibitor member.

In general, the objects of the present invention are achieved by providing in a hollow bodied lure, an elongated tape member having a plurality of sections of different visual characteristics and means for movably positioning the various sections of the tape to bring it in alignment or registry with transparent portions of the body of the lure. The present invention contemplates a lure having substantial areas of the body formed of at least semi-transparent material. By mounting the tape on a pair of spools positioned internally, fore and aft of the lure, it is possible to turn the spools and thus change the position of tape and, therefore, that portion thereof which is in registry with the transparent portions of the body by a simple screwdriver adjustment without the necessity of dis-assembling the lure.

Referring now to the drawings, FIGURE 1 shows the lure in a preferred form in side elevation and it will be noted that the body 10 is hollow and includes an upper portion 12 and a lower portion 14, which portions are joined together at substantially the geometrical centerline of the lure indicated at 16. The particular shape of the lure body is entirely optional but the one shown is entirely conventional and includes a line-attaching eye 18 at the forward end thereof and immediately forward of a conventional wobble plate 20. As is usual in lures of this type, a pair of treble hooks 22 and 24 are affixed to the underside and the tail portions, respectively, of the body 10. The unstippled portion of the body shown in FIGURE 1 is preferably transparent or at least semi-transparent in order to expose a predetermined section of the changeable exhibitor which will be described more fully hereinafter.

Referring now to FIGURE 6, this figure shows portions of an elongated tape 26 and it will be noted that the tape is divided into a plurality of sections, each section having a different visual characteristic. The visual characteristic referred to may be either color or pattern or both. Preferably, this tape is formed of a synthetic plastic which is flexible, wear resistant, and color fast as regards the different visual characteristic bearing sections.

In accordance with the present invention, and as shown in FIGURES 2 to 5 inclusive, the tape 26 is wound on a pair of spools 28 and these spools are mounted with their axes in parallel relationship at spaced points within the hollow body 10 of the lure. At their lower ends, preferably as shown in FIGURES 2 and 3, the spools 28 terminate in a slotted head 32 and these heads are freely accessible from the lower portion of the lure so that a screwdriver or other tool (for example, a coin such as a dime) may be used to rotate the spools and thus change the section of the tape which is in registry with the transparent portions of the body. As shown in FIGURE 3, the lower portion of the body 14 includes for receiving each spool, a bore 34 and a pair of counterbores 35 and 36. Positioned within each counterbore 35 is an O ring 38 which is effective to make a watertight seal between the head portion 32 of the spool and the body proper.

Referring now to FIGURES 3 and 4 of the attached drawings, it will be seen that the path of the tape from the rear spool is forwardly of the lure and around a guide member 40, thence rearwardly of the lure and around an idler roller 42 and then onto the forward spool 28. It will be apparent from this arrangement, that a pair of parallel runs of the tape are established and that these runs are in register with the transparent side portions of the body member 10. As a practical matter, the lengths of the individual sections of the tape having a given visual characteristic are of sufficient length that if desired, the same characteristic will be visible from opposite sides of the lure simultaneously. On the other hand, and if desirable, the tape may be positioned so that one characteristic is visible from one side and a different characteristic from the other.

From the foregoing description it will be apparent to those skilled in this art that there is herein shown and disclosed a new and useful fishing lure of the changeable color and/or pattern type. While a preferred embodiment has been herein shown and disclosed, applicant claims the benefit of a full range of equivalents within the scope of the appended claims.

I claim:

1. A changeable color and/or pattern fishing lure comprising in combination:

a line attachable hollow body having hooks supported thereon and at least a portion of said body being at least semi-transparent;

an elongated tape having a plurality of sections of different visual characteristics, said tape being mounted interiorly of said body;

and means carried by said body and engaging with said tape for selectively positioning different sections thereof in registry with the transparent portion of said body.

2. A lure as defined by claim 1 in which at least the semi-transparent portion of said body extends over substantial portions of opposite sides thereof and in which sections of said tape having a given visual characteristic are selectively positionable to exhibit the same characteristic from opposite sides of said lure.

3. A lure as defined by claim 1 including a pair of spools rotatably mounted within said body and wherein said tape is wound on said spools.

4. A lure as defined by claim 3 wherein said spools terminate at the outer surface of said body in slotted heads to facilitate rotation thereof.

5. A changeable color and/or pattern fishing lure comprising in combination:
- an elongated hollow body having hooks and line attaching means supported thereon, a substantial portion of the length of said body on opposite sides thereof being at least semi-transparent;
- a pair of spool members rotatably mounted within said body, spaced from each other and terminating on the exterior of said body in slotted heads to facilitate turning thereof,
- and an elongated tape including a plurality of section of different visual characteristics, said tape being wound on said spools, and selectively positionable by rotation of said spools to register sections thereof with said transparent body portion.

References Cited
UNITED STATES PATENTS

| | | | |
|---|---|---|---|
| 2,508,820 | 5/1950 | Fraley. | |
| 2,884,732 | 5/1959 | Bailer | 43—42.33 |
| 3,210,882 | 10/1965 | Purdom | 43—42.33 |

SAMUEL KOREN, *Primary Examiner.*

ALDRICH F. MEDBERY, *Examiner.*

D. J. LEACH, *Assistant Examiner.*